(12) United States Patent
Zhang et al.

(10) Patent No.: US 10,628,935 B2
(45) Date of Patent: Apr. 21, 2020

(54) METHOD AND SYSTEM FOR IDENTIFYING DEFECTS OF INTEGRATED CIRCUITS

(71) Applicant: Dongfang Jingyuan Electron Limited, Beijing (CN)

(72) Inventors: Zhaoli Zhang, San Jose, CA (US); Jie Lin, San Jose, CA (US); Zongchang Yu, San Jose, CA (US)

(73) Assignee: Zhongke Jingyuan Electron Limited, Beijing (CN)

( * ) Notice: Subject to any disclaimer, the term of this patent is extended or adjusted under 35 U.S.C. 154(b) by 30 days.

(21) Appl. No.: 15/419,657

(22) Filed: Jan. 30, 2017

(65) Prior Publication Data
US 2018/0218492 A1   Aug. 2, 2018

(51) Int. Cl.
*G06T 7/00*       (2017.01)
*G06K 9/46*       (2006.01)

(52) U.S. Cl.
CPC .......... *G06T 7/0006* (2013.01); *G06K 9/4604* (2013.01); *G06T 7/001* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 5,600,734 A | 2/1997 | Okubo et al. | |
| 6,539,106 B1 | 3/2003 | Gallarda et al. | |
| 2001/0033683 A1 | 10/2001 | Tanaka et al. | |
| 2008/0075352 A1* | 3/2008 | Shibuya | G01N 21/9501 382/141 |

(Continued)

FOREIGN PATENT DOCUMENTS

| | | | |
|---|---|---|---|
| JP | 2000228430 A | * | 8/2000 |
| JP | 2000228430 A | | 8/2000 |

(Continued)

OTHER PUBLICATIONS

International Search Report dated Apr. 5, 2018 from correspondiong PCT Application No. PCT/US2017/067001.

*Primary Examiner* — Jiangeng Sun
(74) *Attorney, Agent, or Firm* — Young Basile Hanlon & MacFarlane, P.C.

(57) ABSTRACT

Methods and systems for identifying defects in an integrated circuit are provided. The method includes receiving input data of a pattern associated with an integrated circuit, determining feature data associated with features of the pattern using the input data, determining defect detection results associated with the pattern using the input data, the feature data, and defect detection techniques, and determining a defect identification result using the defect detection results. The system includes a processor and a memory. The memory is coupled to the processor and configured to store a set of instructions to receive input data of a pattern associated with an integrated circuit, determine feature data associated with features of the pattern using the input data, determine defect detection results associated with the pattern using the input data, the feature data, and defect detection techniques, and determine a defect identification result using the defect detection results.

16 Claims, 8 Drawing Sheets

(56) References Cited

U.S. PATENT DOCUMENTS

2015/0254832 A1* 9/2015 Plihal .................... G06T 7/001
                                                            382/149
2016/0306009 A1* 10/2016 Gao .................... G01R 31/307
2017/0074810 A1* 3/2017 Adler .................... G01N 21/956

FOREIGN PATENT DOCUMENTS

JP         2010231044 A  * 10/2010
JP         2010231044 A    10/2010

* cited by examiner

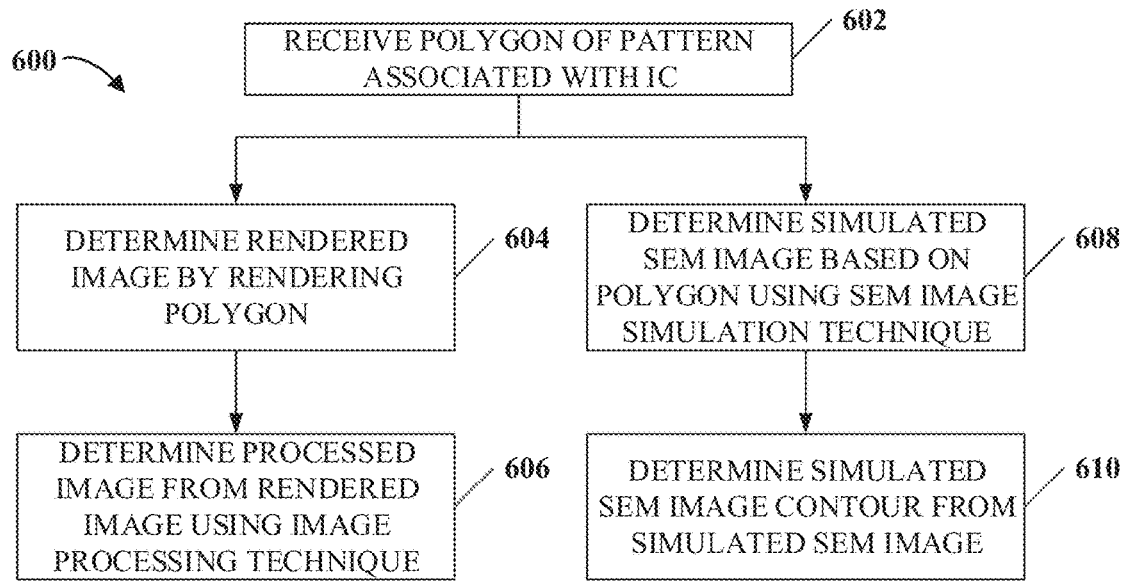
FIG. 6
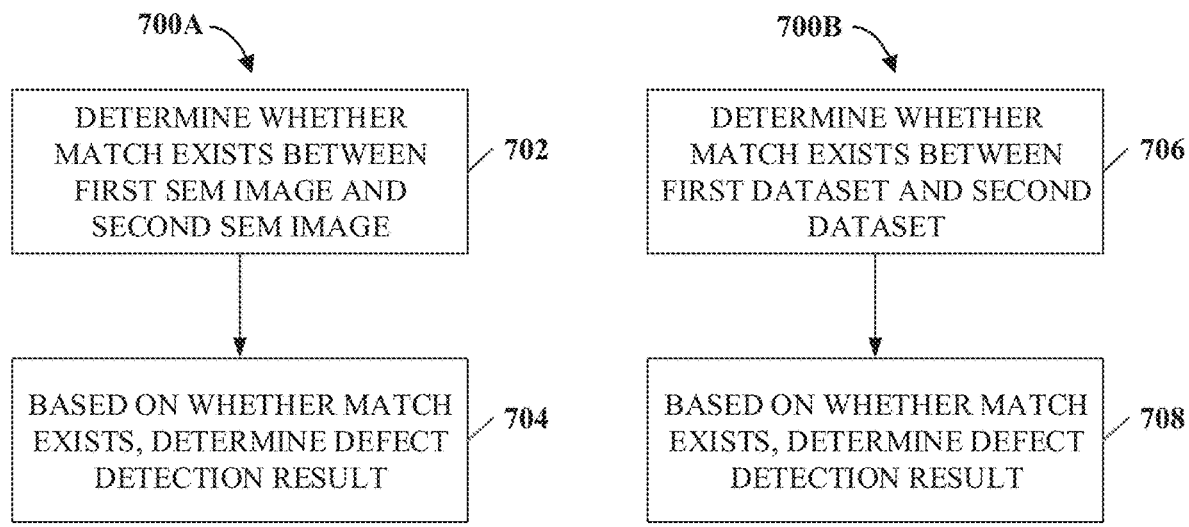
FIG. 7A
FIG. 7B

METHOD AND SYSTEM FOR IDENTIFYING DEFECTS OF INTEGRATED CIRCUITS

TECHNICAL FIELD

This disclosure relates to integrated circuits, and more specifically, to methods and systems for identifying defects of integrated circuits.

BACKGROUND

The manufacture of integrated circuits (ICs) is a multi-step process carried out on a substrate such as a wafer. Multiple integrated circuits are typically produced on each wafer and each IC can be referred to as a die. Die inspection is one step of the manufacturing process. Inspection systems can detect defects that occur during the manufacturing process. Optical wafer inspection systems have been conventionally used for wafer and/or die inspection.

SUMMARY

Disclosed herein are aspects, features, elements, and implementations of methods and systems for defect identification of integrated circuits.

In a first aspect, a method for identifying defects of integrated circuits is provided. The method includes receiving input data of a pattern associated with an integrated circuit, determining feature data associated with features of the pattern using the input data, determining defect detection results associated with the pattern using the input data, the feature data, and defect detection techniques, and determining a defect identification result using the defect detection results.

In a second aspect, a system for identifying defects of integrated circuits is provided including a processor and a memory coupled to the processor. The memory includes instructions executable by the processor to receive input data of a pattern associated with an integrated circuit, determine feature data associated with features of the pattern using the input data, determine defect detection results associated with the pattern using the input data, the feature data, and defect detection techniques, and determine a defect identification result using the defect detection results.

In a third aspect, a non-transitory computer readable storage medium for identifying defects of integrated circuits is provided including executable instructions that, when executed by a processor, facilitate performance of operations. The operations include receiving input data of a pattern associated with an integrated circuit, determining feature data associated with features of the pattern using the input data, determining defect detection results associated with the pattern using the input data, the feature data, and defect detection techniques, and determining a defect identification result using the defect detection results.

These and other aspects of this disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is a flowchart of another example process of a method for feature data generation according to implementations of this disclosure.

FIGS. 7A-7B are flowcharts of example processes of methods for defect detection according to implementations of this disclosure.

DETAILED DESCRIPTION

Figure 1:
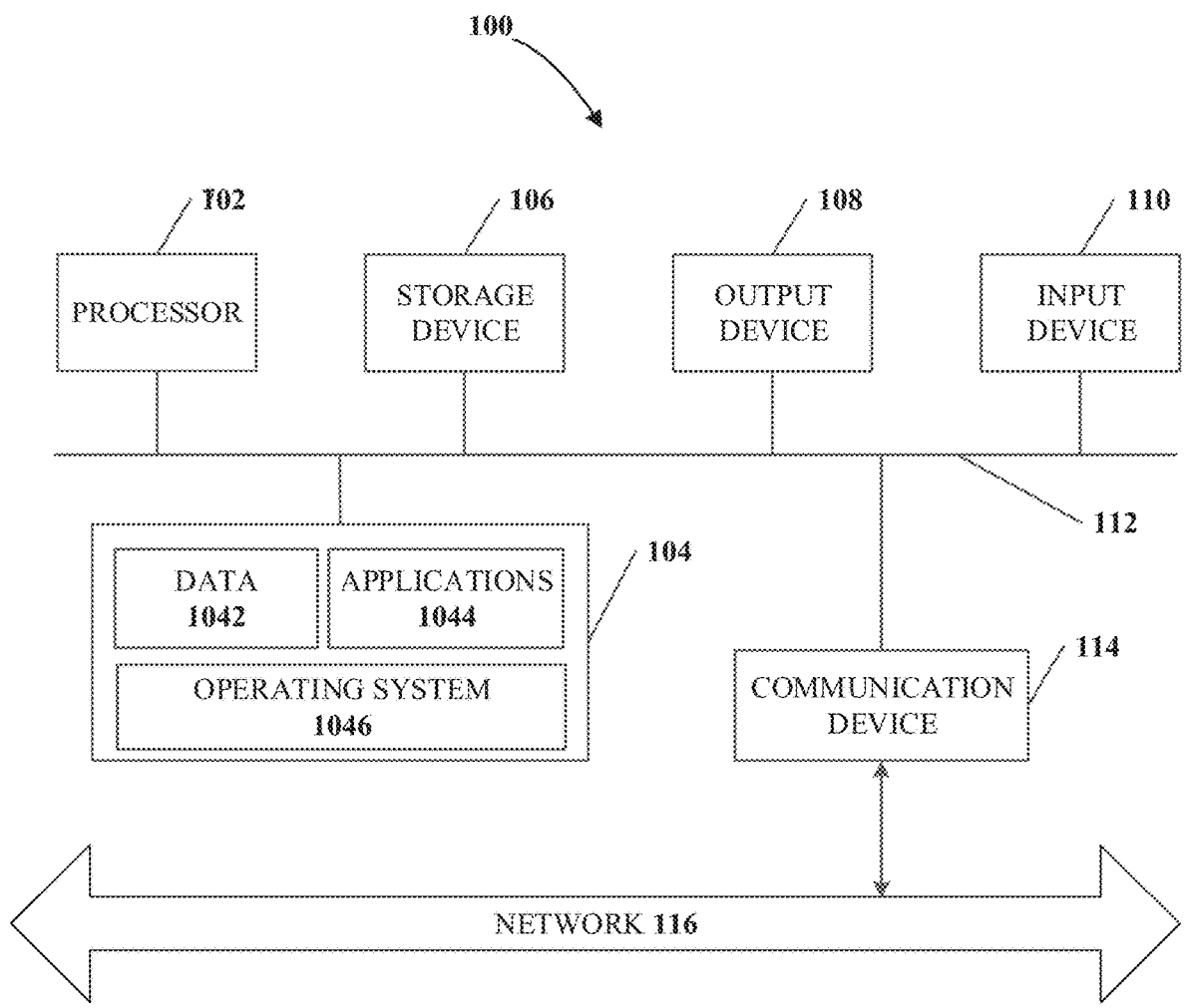
FIG. 1 is a block diagram of an example system used for defect identification according to implementations of this disclosure.

The manufacture of microchip devices continually strives for smaller sized elements to achieve higher density for integrated circuit (IC) designs on a target wafer. A wafer, also referred to as a substrate, is a thin slice of semiconductor material used for the fabrication of integrated circuits. For example, demand for 10 nanometer (nm) resolution and beyond now exists for features of logic circuits and arrays (e.g., FinFETs, DRAMs, 3D NAND, etc.) in microchip semiconductor fabrication. The process of manufacturing integrated circuits (ICs) involves several phases, including a design phase, a manufacturing phase, and an inspection phase. During the inspection phase, ICs manufactured during the manufacturing phase are inspected for potential defects. The results of the inspection can be used to improve or adjust the design, the manufacturing, the inspection phases, and any combination thereof.

Detecting defects in such devices and/or defects of small sizes is a challenge in semiconductor manufacturing facilities. Conventional high throughput inspection systems (e.g., optical inspection systems) lack, for example, the resolution to find defects (e.g., physical defects) in manufactured devices. As such, optical inspection systems are not suitable for detecting defects with sizes below their optical resolutions. On the other hand, high-resolution inspection systems, such as electron beam (e-beam or EBEAM) systems, can detect such defects. A high-resolution inspection system uses short-wavelength electromagnetic or particle (charged or neutral) beams to inspect defects. For example, the short-wavelength electromagnetic or particle beams can include, but not limited to, ultraviolet beams, extreme ultraviolet beams, X-ray beams, or electron beams. However, e-beam systems have low throughput. As such, the applicability and suitability of e-beam systems for production line (or inline) defect inspection of integrated circuits has been limited. For example, one week or more may be required to fully scan a single integrated circuit or die using an e-beam system. As such, e-beam systems have conventionally been used during the IC design process or in an off-line inspection and review process and not in inline production systems.

Inspecting an area of a wafer with an e-beam system typically includes beam deflection operations or stage movement operations. A stage movement operation is a mechanical operation which takes a non-negligible amount of time. In this disclosure, "wafer" can refer to a wafer, a reticle, or any specimen to be inspected. Areas of a wafer or a die to be inspected by an e-beam system are typically specified in a recipe file.

One way to increase the throughput of the e-beam system is to generate "care areas" of the wafer and guide the e-beam system to scan the care areas. A care area is an area of a wafer under inspection suspected of containing at least one defect or a "hot spot." As used herein, a "hot spot" can refer to a potential defect. A recipe file can include multiple care areas and, inter alia, coordinates of the care areas. The e-beam system typically moves from one care area to the next in the order specified in recipe file. If the next care area to be inspected is within the e-beam system's field of view (FOV), then a beam deflection operation is performed in order to scan the next scan area. If the next care area is not within the FOV, then a stage movement operation is performed.

The high-resolution system (e.g., the e-beam system) is then guided to scan the ICs (e.g., dies or reticles) in the care areas and generate scanned images thereof. The scanned image can be in a form of scanning electron microscope (SEM) images. Defect detection is performed based on the scanned images. Generally, two types of defect detection techniques can be used: a die-to-die (D2D) technique and a die-to-database (D2DB) technique.

The D2D technique compares a first scanned image (e.g., a SEM image) of a first portion of a first IC with a second scanned image (e.g., another SEM image) of a second portion of a second IC. As a result of the comparison, a defect is reported on either the first or the second portion when a certain difference are found between the first and second scanned images. The first and second scanned images can be generated from different inspected ICs (i.e., the first and second ICs are different inspected ICs). Alternatively, the D2D technique can compare a scanned image generated from a portion of an inspected IC with a portion of a "reference image." As a result of the comparison, a defect is reported on the portion of the inspected IC when a certain difference is found between the scanned image and the reference image. The reference image is an image representing an ideal or high-quality IC of the same type. The reference image can be generated from a real high-quality IC using the high-resolution inspection system, or synthesized using several scanned images of high-quality ICs. The reference image can also be calculated or computed based on scanned images of ICs, simulated images, and/or design data of the ICs. Corrections can be applied to the reference image to further improve the quality in any stage of generation thereof.

However, the D2D technique has some challenges. One of the challenges are false positive and/or false negative results. The false positive results occur when a defect is detected in the inspected IC while the detected defect is not real or not detrimental. The false negative results occur when no defect is detected in the inspected IC while there is actually at least one. If the D2D technique is performed using scanned images of different ICs, the false positive and/or false negative results can occur when all or majority of inspected areas of the ICs have the same kind of defects (e.g., a systematic defect). If the D2D technique is performed using a reference image, the false positive and/or false negative results can occur when the reference image itself contains a defect.

The D2DB technique extracts contours from a scanned image (e.g., a SEM image) of a portion of an IC, then compares the contours to corresponding design data of the IC. The design data includes design layout of the IC, and can be in a form of graphic design standard layout or graphic design system/stream (GDS) file. The design layout can include polygons of the designed IC. As a result of the comparison, a defect is reported when deviation between the contour extracted from the scanned image and the contours included in the design data (e.g., a GDS file) exceeds a preset threshold.

However, the D2DB technique also has some challenges. A challenge of the D2DB technique is that, high-quality SEM images are needed to generate reliable contours to be compared with corresponding design data. Commonly, the high-quality SEM images are obtained by scanning the ICs with a small beam size and averaging multiple scanned images (e.g., frames of scanned images). Obtaining the high-quality SEM images can take a long time and thus lowers throughput of the inspection system.

Another challenge of the D2DB technique is that, due to inherent limitations of current IC manufacturing tools, final patterns printed on a wafer can never perfectly match corresponding design data (e.g., a design GDS layout). For example, when features of the final patterns to be printed on the wafer are smaller than wavelengths of exposure tools, a sharp corner in the design GDS layout will be rounded due to optical diffraction effects. As a result, a direct comparison between the contours extracted from the scanned image and the design data is expected to report false defects, usually called "nuisances." Many of the nuisances are a result of physical limitations of the current IC manufacturing tools and processes. The nuisances are not expected to cause performance issues in the manufactured ICs.

Another challenge of the D2DB technique is that, the contours extracted from the SEM images are seldom the physical edges of the patterns printed on the wafer. Due to complicated nature of electron-material interactions and complicated nature of collection of information-carrying electron signal in e-beam inspection systems, the relationship between the SEM images and the physical patterns under inspection is very difficult to establish. A method that extracts contours based on physics of SEM image formation in e-beam inspection systems is very time-consuming and computationally expensive. In many practical applications, especially in e-beam inspection for which the inspection throughput is the most important factor in system designs, digital image processing techniques are more relied on. However, the digital image processing techniques neglect the complicated nature of SEM image formation in e-beam inspection systems. As a consequence, comparing contours extracted solely based on the digital image processing techniques with the design data (e.g., design GDS layouts) can cause false negative and/or false positive results.

The present disclosure provides new methods and systems for defect detection/identification using a high-resolution inspection system. The disclosed method herein can be referred as a "D3D" method for defect identification. Implementations of this disclosure provide technological improvements to semiconductor inspection machines (e.g., e-beam systems), processes and computer systems, for example, those semiconductor machines and computer systems concerning the inspection of manufactured or fabricated semiconductor ICs. According to implementations of this disclosure, the D3D method and system can overcome the limitations of the aforementioned D2D and D2DB techniques.

In the D3D method and system, feature data can be generated from input data (e.g., scanned images, reference images, and/or design data) associated with a pattern of an IC. Defect detection techniques can be applied on the input data and the feature data to determine defect detection results on the IC. The defect detection results are not required to have high sensitivity or high specificity. Based on the defect detection results, the defect identification is performed using data fusion/integration techniques, decision tree techniques, and/or boosting techniques. Implementations of this disclosure can thus introduce new and efficient improvements in the ways in which both high sensitivity and high specificity of defect detection/identification in ICs can be achieved.

While the disclosure has been described in connection with certain embodiments and implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Additionally, while this disclosure refers to e-beam scanning machine or high-resolution e-beam scanning machine, it is to be understood that the teachings herein can be implemented using any type of scanning machine such as, for example, a high-resolution scanning machine which may have low throughput. For example, the high-resolution scanning machine can be based on high-resolution optical inspection tools. For another example, the high-resolution inspection machine can be based on ultraviolet, extreme ultraviolet, X-ray, charged particles, or neutral particles.

To describe some implementations in greater detail, reference is made to the following figures.

FIG. 1 is a block diagram of a system 100 used for defect identification in accordance with implementations of this disclosure. The system 100 can include an apparatus such as a computing device, which can be implemented by any configuration of one or more computers, such as a microcomputer, a mainframe computer, a super computer, a general-purpose computer, a special-purpose/dedicated computer, an integrated computer, a database computer, a remote server computer, a personal computer, or a computing service provided by a computing service provider, e.g., a web host, or a cloud service provider. In some implementations, the computing device can be implemented in the form of multiple groups of computers that are at different geographic locations and can or cannot communicate with one another, such as by way of a network. While certain operations can be shared by multiple computers, in some implementations, different computers are assigned different operations. In some implementations, the system 100 can be implemented using general-purpose computers/processors with a computer program that, when executed, carries out any of the respective methods, algorithms and/or instructions described herein. In addition, or alternatively, for example, special purpose computers/processors can be utilized which can contain specialized hardware for carrying out any of the methods, algorithms, or instructions described herein.

The system 100 can have an internal configuration of hardware including a processor 102 and a memory 104. The processor 102 can be any type of device or devices capable of manipulating or processing information. In some implementations, the processor 102 can include a central processor (e.g., a central processing unit or CPU). In some implementations, the processor 102 can include a graphics processor (e.g., a graphics processing unit or GPU). Although the examples herein can be practiced with a single processor as shown, advantages in speed and efficiency can be achieved using more than one processor. For example, the processor 102 can be distributed across multiple machines or devices (each machine or device having one or more of processors) that can be coupled directly or connected across a local area network or other networks. The memory 104 can be any transitory or non-transitory device or devices capable of storing codes and data that can be accessed by the processor (e.g., via a bus). For example, the memory 104 can be accessed by the processor 102 via a bus 112. Although a single bus 112 is shown, multiple buses can be utilized. The memory 104 herein can be a random access memory device (RAM), a read-only memory device (ROM), an optical/magnetic disc, a hard drive, a solid state drive, a flash drive, a security digital (SD) card, a memory stick, a compact flash (CF) card, or any combination of any suitable type of storage device. In some implementations, the memory 104 can be distributed across multiple machines or devices, such as a network-based memory or cloud-based memory. The memory 104 can include data 1042, an operating system 1046 and an application 1044. The data 1042 can be any data for processing (e.g., computerized data files or database records). The application 1044 can include programs that permit the processor 102 to implement instructions to generate control signals for performing functions of the methods in the following description.

In some implementations, besides the processor 102 and the memory 104, the system 100 can also include a secondary, additional or external storage device 106. When present, the storage device 106 can provide additional memory when high processing requirements exist. The secondary storage device 106 can be a storage device in the form of any suitable non-transitory computer readable medium, such as a memory card, a hard disc drive, a solid state drive, a flash drive or an optical drive. Further, the storage device 106 can be a component of the system 100 or can be a shared device that is accessed via a network. In some implementations, the application 1044 can be stored in whole or in part in the storage device 106 and loaded into the memory 104 as needed for processing. For example, the storage device 106 can be a database.

In some implementations, besides the processor 102 and the memory 104, the system 100 can include an output device 108. The output device 108 can be implemented in various ways, for example, it can be a display that can be coupled to the system 100 and configured to display a rendering of graphic data. The output device 108 can be any device transmitting a visual, acoustic, or tactile signal to a user, such as a display, a touch sensitive device (e.g., a touch screen), a speaker, an earphone, a light-emitting diode (LED) indicator, or a vibration motor. If the output device 108 is a display, for example, it can be a liquid crystal display (LCD), a cathode-ray tube (CRT), or any other output device capable of providing visible output to an individual. In some cases, an output device can also function as an input device—a touch screen display configured to receive touch-based input, for example.

The output device 108 can alternatively or additionally be formed of a communication device for transmitting signals and/or data. For example, the output device 108 can include a wired mean for transmitting signals or data from the system 100 to another device. For another example, the output device 108 can include a wireless transmitter using a protocol compatible with a wireless receiver to transmit signals from the system 100 to another device.

In some implementations, besides the processor 102 and the memory 104, the system 100 can include an input device 110. The input device 110 can be implemented in various ways, such as a keyboard, a numerical keypad, a mouse, a trackball, a microphone, a touch sensitive device (e.g., a touch screen), a sensor, or a gesture-sensitive input device. Any type of input device not requiring user intervention is also possible. For example, the input device 110 can be a communication device such as a wireless receiver operating according to any wireless protocol for receiving signals. The input device 110 can output signals or data, indicative of the inputs, to the system 100, e.g., via the bus 112.

In some implementations, besides the processor 102 and the memory 104, the system 100 can optionally include a communication device 114 to communicate with another device. Optionally, the communication can be via a network 116. The network 116 can be one or more communications networks of any suitable type in any combination, including, but not limited to, networks using Bluetooth communications, infrared communications, near field connections (NFC), wireless networks, wired networks, local area networks (LAN), wide area networks (WAN), virtual private network (VPN), cellular data networks and the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the system 100 using the bus 112 to provide functions of communication with the network 116.

The system 100 can communicate with a wafer or reticle high-resolution inspection equipment. For example, the system 100 can be coupled to one or more wafer or reticle inspection equipment, such as an e-beam system or an optical system, configured to generate wafer or reticle inspection results.

The system 100 (and algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In this disclosure, the term "processor" should be understood as encompassing any the foregoing, either singly or in combination. The terms "signal," "data," and "information" are used interchangeably. Further, portions of system 100 do not necessarily have to be implemented in the same manner.

Figure 2:
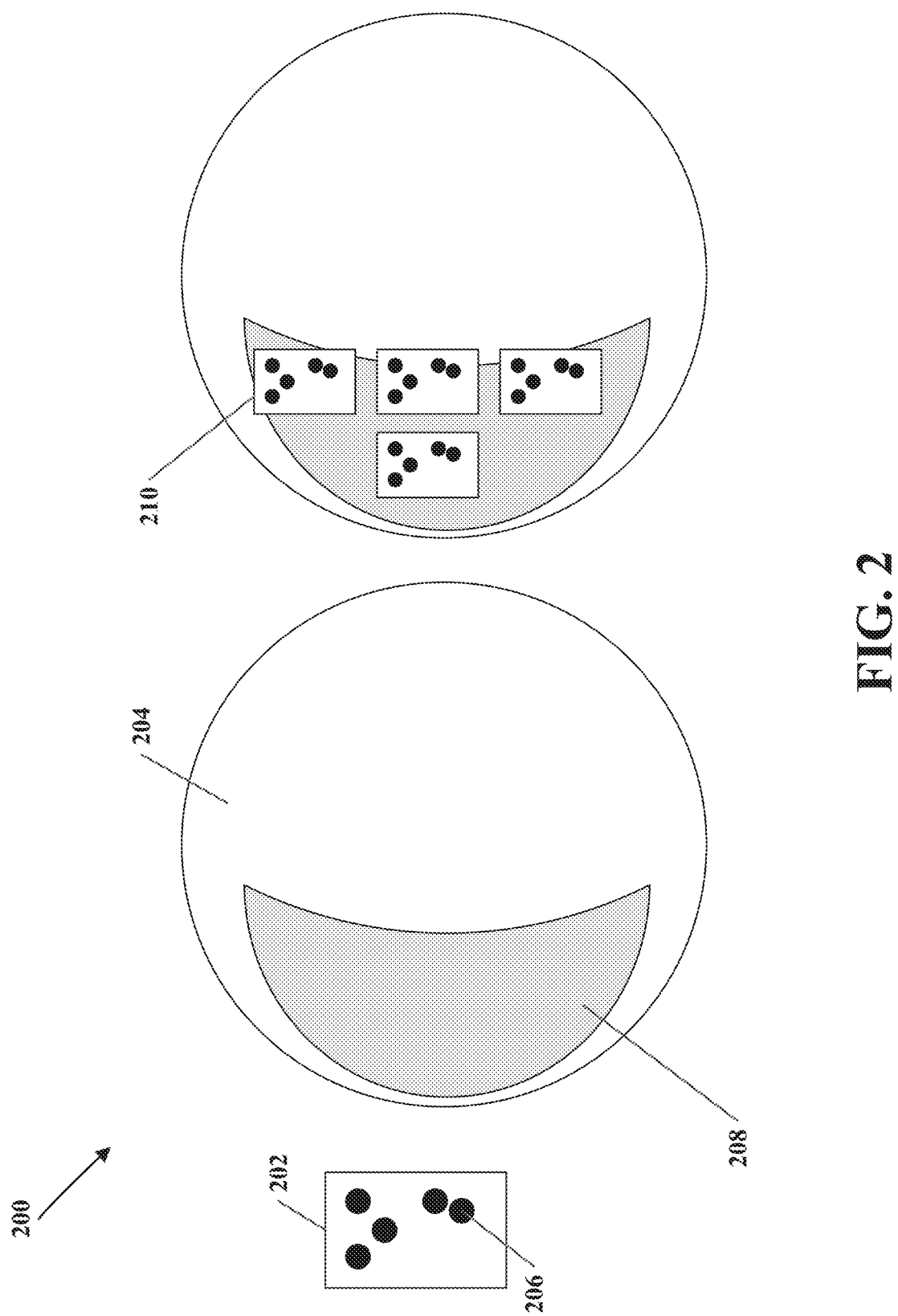
FIG. 2 is an example of an operation for defect inspection according to implementations of this disclosure.

FIG. 2 is an example of an operation 200 for defect inspection according to implementations of this disclosure. The operation 200 illustrates a manufacturing process and/or design process of an integrated circuit 202 (e.g., a die). The integrated circuit 202 is analyzed during the operation 200 to determine hot spots 206 (i.e., black circles on the integrated circuit 202 of FIG. 2). A hot spot relates to a design pattern which, when manufactured under undesirable or unexpected manufacturing process conditions (i.e., process condition variations or process variability), can render a die inoperable or result in an actual defect within the die that affects the overall performance of the die. Undesirable or unexpected manufacturing process conditions are manufacturing conditions that deviate from the ideal process conditions. ICs manufactured under ideal process conditions exhibit minimal or no defects.

In the operation 200, a wafer 204 under inspection by an inspection process is scanned by a high-resolution system including but not limited to an electron beam (e-beam) system to obtain or provide a process condition variation map. The process condition variation map is obtained by scanning the wafer 204 for certain pre-designed or pre-selected patterns and analyzing the high-resolution images via, for example, a set of computer instructions. The pre-designed or pre-selected patterns are IC design patterns which are suspected to be sensitive to process condition variations. For example, the shapes of the pre-designed or pre-selected patterns on wafer can change substantially when the manufacturing process experiences variations from ideal conditions. The pre-designed or pre-selected patterns can be selected based on prior knowledge (from information of an operator, information stored in a database, or information extracted using machine learning techniques) that the areas are sensitive to process condition variations. The pre-designed or pre-selected patterns can also be selected based on the chip designs of the integrated circuits being manufactured and inspected. Metrology or measurement results from these pre-designed or pre-selected patterns, obtained with an e-beam system, are then converted to process condition parameters. The process condition parameters can be used to generate one or more process condition variation maps. A process condition variation map indicates how different parts of a wafer may be affected by variations in the process conditions (e.g., variation in focus or dose). Variations in process conditions can result in defects in the manufactured dies.

In the operation 200, a process condition variation map reveals that an area 208 of the wafer 204 exhibits significant process condition variations. In another implementation, the area 208 represents the process condition variation map (and not just a subset of the process condition variation map) that has been determined via the operation 200. As such, the inspection process of the operation 200 only inspects certain dies (such as a die 210) of the wafer 204 for defects which is more efficient and less time-consuming than an inspection process that inspects the entire area of the wafer 204. The dies to be inspected for defects are those dies which are included in, or overlap with, the area 208. In another implementation, the dies that are inspected include dies that are within a predetermined area or distance of the area 208 even if they don't overlap with or are not enclosed within the area 208.

The hot spots of such dies may be determined upon further inspection to be true actual defects. Whether any of the hot spots of the die 210 is a true defect is determined by an inspection (e.g., additional scanning by the e-beam system). The hot spots of dies that are outside of, or not overlapping, the area 208 are not expected to result in actual defects and, therefore, do not have to be inspected. As described below, inspecting a hot spot means inspecting a care area that contains the hot spot. In an implementation, only care areas overlapping the area 208 are inspected. That is, instead of inspecting all the care areas of a die that is included in, or overlaps, the area 208, only the care areas inside the area 208 of those dies are inspected. While the area 208 is illustratively shown as a continuous area, this need not be the case. The shape of area 208 is not so limited and for example, can comprise various shapes separated by gaps or spaces.

In an implementation, the hot spots are assigned severity levels based upon various factors including but not limited to design features and the purpose or usage of the integrated circuits. The hot spots that are determined to have a high severity level and are thus deemed to be more important than hot spots with lower severity levels (e.g., hot spots that have high severity levels because they are near critical areas of the integrated circuit) are also scanned even if they do not fall within or overlap with the area 208. In other words, if dies that fall outside of the process condition variation map include hot spots that have been determined to have a high severity (e.g., a severity level that is greater than a threshold severity value) or importance level, they can also be scanned for actual defects. In an implementation, potential defects with low severity values are also called warm spots. Warm spots are less likely to become an actual defect. When resources are less available or constrained, areas containing warm spots can be skipped for inspection. A resource can be the amount of time available to the e-beam system to scan during the inspection process. Whether and which warm spots are included in the list for inspection is determined by resource availability and its severity.

As illustrated by the operation 200, an inspection method and system in accordance with the present disclosure significantly reduce wafer regions and dies to be inspected by a high-resolution inspection or e-beam system. Consequently, the time and cost required to inspect a manufactured wafer and the associated integrated circuits or dies is reduced and a low throughput, high-resolution, e-beam scanning machine or device can be used for in-line inspection of the semiconductor manufacturing process.

Figure 3:
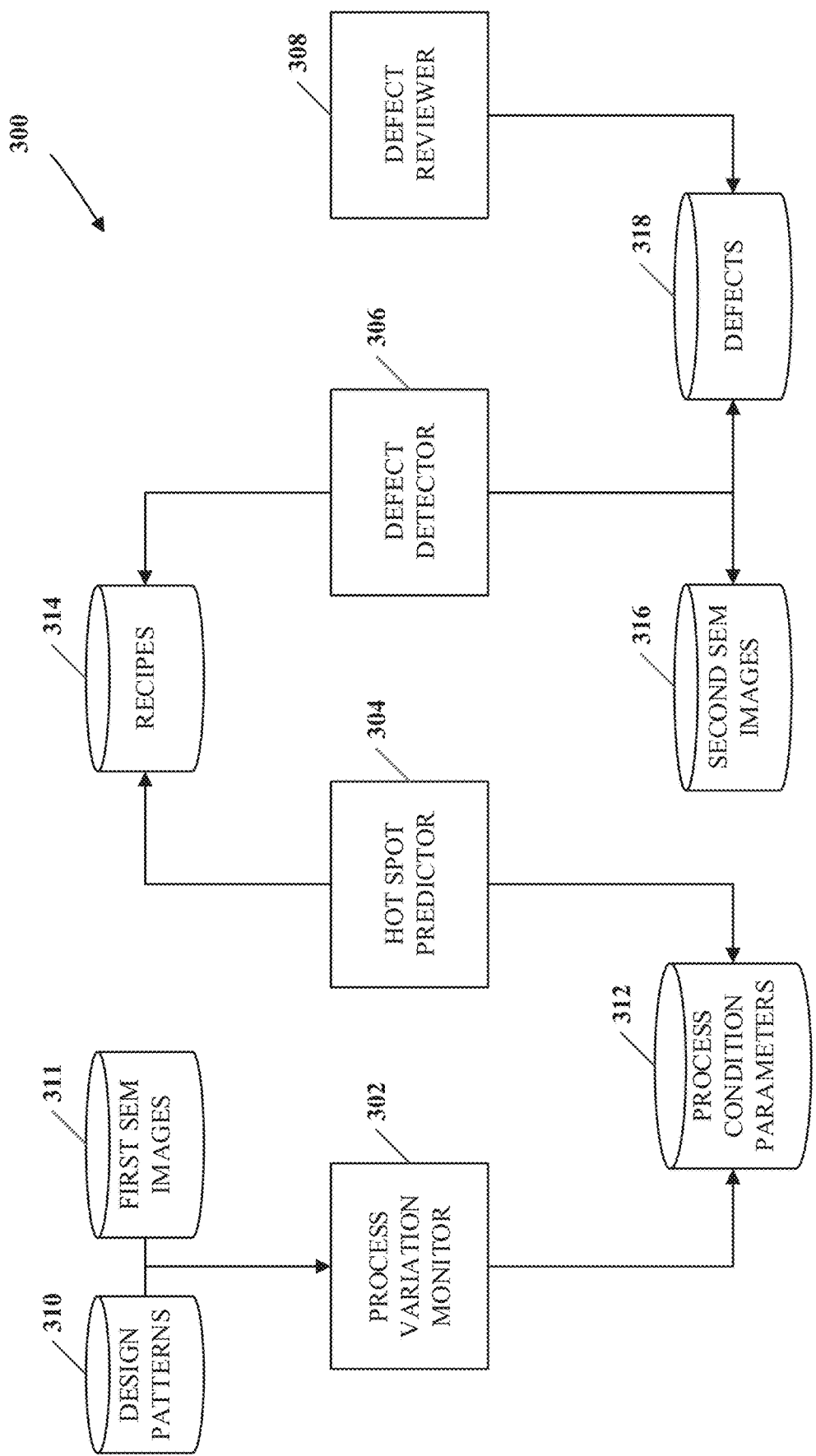
FIG. 3 is an example of a system for defect inspection according to implementations of this disclosure.

FIG. 3 is an example of a system 300 for detecting defects according to implementations of this disclosure. Aspects of the disclosure, e.g., operations of methods/processes 400-900 of FIGS. 4-9, respectively, can be implemented as software and/or hardware modules in the system 300. For example, one or more apparatuses or systems, such as the system 100 of FIG. 1, can implement one or more modules of the system 300. The system 300 can include or can be operated in conjunction with a high-resolution (e.g., e-beam) scanning and inspection machine.

In an implementation, the system 300 includes a process variation monitor module 302, a hot spot predictor module 304, a defect detector module 306, a defect reviewer module 308, design patterns 310, first scanning electron microscope (SEM) images 311, process condition parameters 312, recipes 314, second SEM images 316, and defects 318.

The design patterns 310 can be stored in a data store, such as a database, of design patterns that are known, or suspected to be, sensitive to variations in the manufacturing or fabrication process (i.e., process variations). For example, process variations can include focus variations and dose variations of the manufacturing process. Process variations can result, for example, in thickness variations, pattern defects, wrongly sized patterns, and like defects in a manufactured IC. The process variation monitor module 302 searches for matches or similarities between the design patterns 310 received or reviewed and one or more integrated circuit design layouts associated with the integrated circuits being manufactured and inspected including, but not limited to, files or layouts generated by or using an electronic design automation (EDA) software. The search can result in a list of identified design patterns. Additionally, or alternatively, the process variation monitor module 302 can receive additional patterns. The term "receive" used herein can refer to receiving, inputting, acquiring, retrieving, obtaining, reading, accessing, or any action in any manner for inputting information or data.

The process variation monitor module 302 causes a high-resolution inspection system (e.g., an e-beam system) to scan patterns on a wafer to identify wafer process condition variation maps. In this context, "cause" can mean sending commands directly to, sending commands via an intermediary mechanism or system, or any other way that causes the high-resolution inspection machine to scan a wafer. The patterns are selected from pre-designed or pre-selected patterns based on, one or more or a combination of, the design rules of a layer of the wafer under manufacturing and the ideal process conditions. The patterns, which are sensitive to process condition variations, can be generated by performing simulations. For example, and without limitation, a simulation of a defocus by 10 nm can be performed and the resulting patterns can be compared to design files. Alternatively, or additionally, the resulting patterns are compared to the results of a simulation of ideal process conditions (e.g., where no defocus is performed).

The process variation monitor module 302 obtains a first set of high-resolution SEM images (e.g., the first SEM images 311) from an inspection equipment, such as, for example, the e-beam system (not shown). Throughout, "obtain" means any way by which a method, a module, or a device can use the indicated information to carry out the functionality of the module or the steps of the method or device. Non limiting examples of "obtain" include requesting information from another source, receiving the information from another source, requesting that another source generate or acquire the information, retrieve from a data store, etc. The process variation monitor module 302 then analyzes the first SEM images 311 and calculates or computes the process condition parameters under which the patterns were manufactured. Analyzing the images includes comparing the images to reference images including, but not limited to, images generated from GDS files associated with the design of the integrated circuits or dies being manufactured and inspected. The process variation monitor module 302 stores the process condition parameters as process condition parameters 312. The process condition parameters 312 can be stored in a transient store, such as the memory 104 of FIG. 1, or a permanent store, such as the storage device 106 of FIG. 1. For example, the permanent store can be a database that stores the design patterns 310 or another database.

The hot spot predictor module 304 generates care or concern areas based on the process condition parameters 312 that are received or obtained from the store that stores them. A care area is an area on a fabricated wafer, such as an area of a die, which can receive inspection for the detection of defects. A care area may be inspected because it is suspected of containing a defect in the die being manufactured. The hot spot predictor module 304 can predict hot spots (i.e., potential defects) on the IC design layouts based on the process condition parameters 312 identified by the process variation monitor module 302 and feature data generated based on the design patterns 310. The feature data can be indicative of features of the design patterns 310. For example, the feature data can be generated based on lithography simulation (e.g., a full simulation) using the design patterns 310. The hot spot predictor module 304 obtains the process condition parameters 312 identified by the process variation monitor module 302 to determine the potential defects or hot spots.

The hot spot predictor module 304 uses the process condition parameters 312 to predict or determine hot spots and to generate a list of care areas therefrom. The hot spot predictor module 304 can generate one or more recipes 314 (or recipe files) based on the list of care areas. The recipes 314 can be stored in a similar database that stores the design patterns 310 and the process condition parameters 312 or a different database. As used herein, a recipe can be a set of one or more machine parameters, scan conditions, care area coordinates, detection mode and other parameters to be used by the high-resolution (e.g., e-beam) inspection system for defect detection.

The e-beam system may be configured based on the recipes 314. The e-beam system can scan a wafer according to a recipe of the recipes 314 or multiple recipes of the recipes 314. The hot spot predictor module 304 can be configured to save a recipe to one or more files. The inspection machine obtains the recipes and performs one or more scans based on the recipes 314. In an implementation, the hot spot predictor module 304 can cause an inspection machine to perform the inspection or the scanning based on the recipes 314. Alternatively, the defect detector module 306 can cause the inspection machine to perform scanning based on the recipes 314. Other ways, as may be configured by a fabrication workflow, can be used to cause an inspection machine to perform the scanning based on the recipes 314. The result of the scanning, based on the recipes 314, is a second set of high-resolution images, such as the second SEM images 316.

In an implementation, the hot spot predictor module 304 can base the predicted hot spots on resource availability. A resource can be the amount of time available to the e-beam system to scan during the inspection process. A resource can also be the complexity of the patterns to be scanned which in turn affects the scan time. When more resources are available, warm spots can also be included in the list of hot spots to be scanned. A warm spot can be a potential defect that is less severe than a hot spot. A warm spot can be a potential defect that is less likely to be a defect than a hot spot. A warm spot can be located within a non-critical region of a die where the non-critical region is manufactured under process conditions that moderately deviate from the ideal manufacturing conditions. A warm spot can be located within a critical region of a die where the critical region is manufactured very close to the ideal manufacturing conditions. When resources are unavailable or are constrained, care areas corresponding to the warm spots can be skipped for inspection as the chances or probabilities that these warm spots adversely affect the functionality of manufactured IC chip are less in comparison to the hot spots. Whether and which warm spots are included in the list of hot spots can be a function of resource availability and based on a likelihood that a warm spot becomes a hot spot.

The defect detector module 306 determines whether the hot spots (i.e., potential defects) are actual defects. To make the determination, the defect detector module 306 can use the second SEM images 316. The defect detector module 306 can, for example, compare SEM images to reference images to identify differences, and/or chip design information associated with the design of the integrated circuit being manufactured and inspected to identify discrepancies between the chip design and a fabricated integrated circuit chip or die as captured in the second SEM images 316. The chip design information can be one or more, or a combination, of reference images of the design, GDS files, or other information indicative of the design. The defect detector module 306 can generate information regarding the hot spots, the actual defects, or both. For example, the defect detector module 306 can store, such as the defects 318, information regarding which hot spots are actual defects, which hot spots are not actual defects, which defects are nuisances (i.e., not detrimental to the overall or proper functioning of a die), which defects are fatal (e.g., including but not limited to defects that affect the functioning of a die), or any combination thereof.

The defect reviewer module 308 can use the defects 318 to improve the overall hot spot prediction and inspection of the integrated circuits. The defect reviewer module 308 can be separate from, be the same as, or can work in conjunction with the hot spot predictor module 304 or other modules of the system 300 of FIG. 3. The defect reviewer module 308 continuously improves the performance of the hot spot prediction accuracy of the hot spot predictor module 304 during the course of inspection. The defect reviewer module 308 includes an update mechanism that enables the system 300 to continuously improve performance of the prediction of the potential defects or hot spots (or even warm spots). The defect reviewer module 308 can utilize machine learning techniques to update the prediction and can also use data from a plurality of manufacturing inspections (either at the same plant or other plants around the world using a similar system). For example, if certain predicted hot spots have been previously found to not include true or actual defects, then the hot spot predictor module 304 can cease generating care areas for these certain predicted hot spots thereby shortening the time associated with the inspection process. In other words, potential defects or hot spots or the care areas generated using the hot spots that never uncover actual defects can be omitted from the inspection process to save time and costs.

Figure 4:
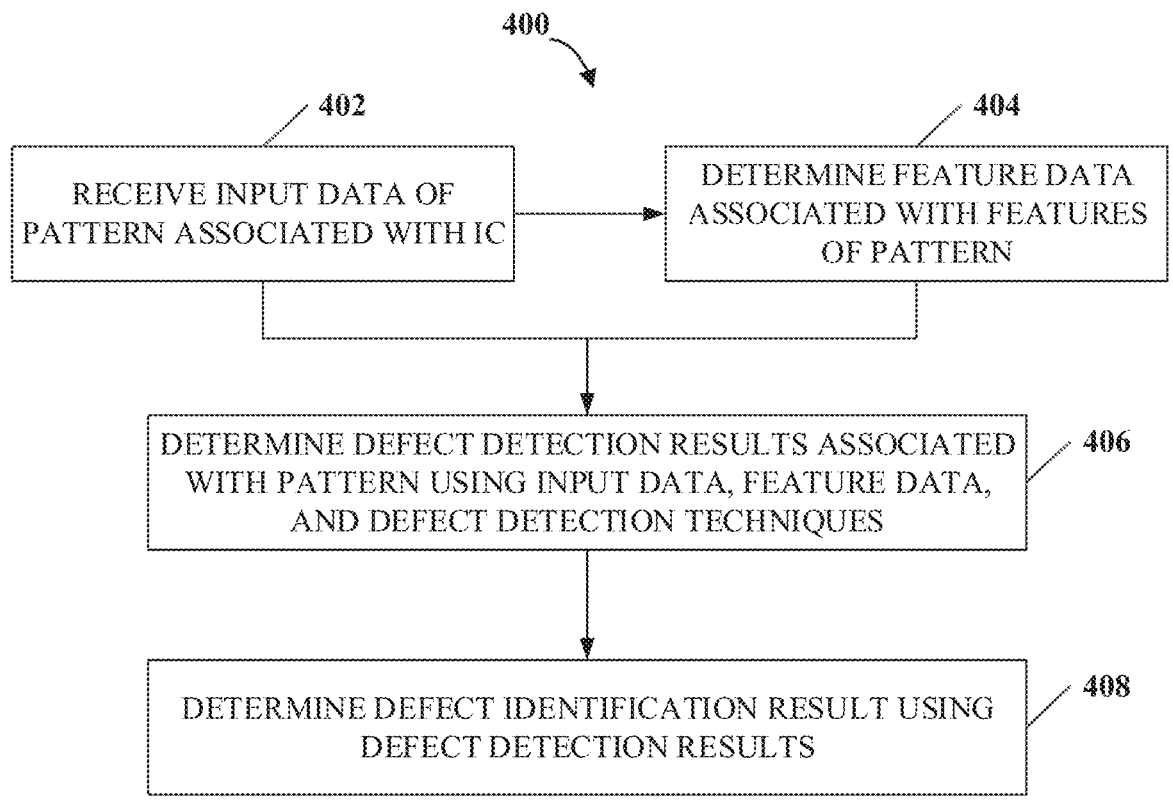
FIG. 4 is a flowchart of an example process of a method for defect identification according to implementations of this disclosure.

FIG. 4 is a flowchart of an example process 400 of a method for defect identification according to implementations of this disclosure. The process 400 can be implemented as software and/or hardware modules in the system 100 of FIG. 1 and/or the system 300 of FIG. 3. For example, the process 400 can be implemented as modules of one or more apparatuses or systems included in the system 300, such as the defect detector module 306. The process 400 includes operations 402-408, which are set forth as follows.

At operation 402, input data of a pattern associated with an integrated circuit (IC) is received. For example, the IC can be manufactured by transfer ("printing") the pattern onto a die of a wafer. The input data includes a scanning electron microscope (SEM) image associated with the pattern, a reference image associated with the pattern, design data associated with a design layout of the pattern, or any combination thereof. The SEM image is determined by a high-resolution inspection system. The design data includes a layout of the IC including the pattern. For example, the design data can include one or more polygons of the IC. In some implementations, the design data can be in a form of GDS files. The design data can be stored in a database (e.g., a design database) and retrieved at the operation 402. The high-resolution inspection system can be an electron beam inspection system. The previous form of the input data are examples, and other input data can be used.

At operation 404, feature data associated with features of the pattern is generated using the input data. In some implementations, the features of the pattern can be geometric or topographical features of the pattern. For example, the feature data can include a SEM image contour generated from the SEM image, a reference image contour generated from the reference image, a polygon associated with the pattern generated from the design data, a rendered image rendered from the polygon, a processed image generated from the rendered image using an image processing technique, a simulated SEM image determined based on the polygon using a SEM image simulation technique, a simulated SEM image contour generated from the simulated SEM image, or any combination of the previous feature data. The contours of the SEM images or simulated SEM images can represent edges of the patterns on wafer. The previous form of the feature data are examples, and other feature data can be used.

At operation 406, the defect detection results associated with the pattern are determined using the input data, feature data, and defect detection techniques. At operation 408, a defect identification result is determined using the defect detection results. Both operations 406 and 408 are described in further detailed below.

Figure 5:
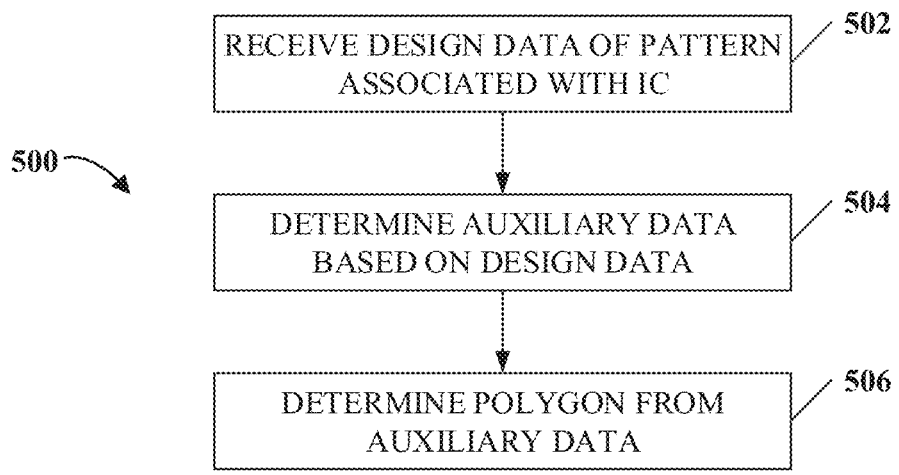
FIG. 5 is a flowchart of an example process of a method for feature data generation according to implementations of this disclosure.

FIG. 5 is a flowchart of an example process 500 of a method for feature data generation according to implementations of this disclosure. The feature data generated in the process 500 is the polygon associated with the pattern. The process 500 can be implemented as software and/or hardware modules in the system 100 of FIG. 1 and/or the system 300 of FIG. 3. For example, the process 400 can be implemented as modules in the system 300 by one or more apparatuses or systems included in the system 100. The process 500 includes operations 502-506, which are set forth as follows.

At operation 502, design data of a pattern associated with an IC is received. The design data can include a polygon associated with the pattern. The design data can be in a form of GDS files. At operation 504, auxiliary data is generated based on the design data (e.g., by analyzing the GDS files). The auxiliary data can be used to increase a speed of retrieving the polygon from the design data. At operation 506, the polygon is obtained from the auxiliary data.

As another example, FIG. 6 is a flowchart of a process 600 of a method for feature data generation according to implementations of this disclosure. The feature data generated in the process 600 includes the rendered image, the processed image, the simulated SEM image, and the simulated SEM image contour. The process 600 can be implemented as software and/or hardware modules in the system 100 of FIG. 1 and/or the system 300 of FIG. 3. For example, the process 600 can be implemented as modules in the system 300 by one or more apparatuses or systems included in the system 100. The process 600 includes operations 602-610, which are set forth as follows.

At operation 602, a polygon of a pattern associated with an IC is received. For example, the polygon can be obtained or generated by the process 500 of FIG. 5. At operation 604, the rendered image can be determined by rendering the polygon using a rendering technique. For example, the polygon can be described in the design data by coordinates and distances. The rendered image of the polygon can be a visualized representation of the polygon. At operation 606, the processed image is generated from the rendered image using an image processing technique. For example, the image processing technique can be digital image processing that adjusts characteristics of the rendered image or applies corrections onto the rendered image.

At operation 608, the simulated SEM image is determined based on the polygon using a SEM simulation technique. The SEM simulation technique can simulate a SEM image of the IC or a portion thereof, including the pattern. The SEM simulation technique can be based on electromagnetics, digital image processing, or a combination thereof. At operation 610, the simulated SEM image contour is extracted or determined from the simulated SEM image. For example, the contour extraction can be based on digital image processing. The contour extraction can be implemented by software and/or hardware modules of the system 300 using predetermined parameters. In some implementations, the parameters of the contour extraction can be obtained and optimized before the contour extraction. In an implementation, the operations 604 and 606 are simultaneously carried out with the operations 608 and 610. In some implementations, the reference image contour and the SEM image contour can be extracted using the same contour extraction technique as in the operation 610.

Back to FIG. 4, at operation 406, based on the input data and the feature data, multiple defect detection results associated with the pattern are determined using different defect detection techniques. Each defect detection technique can generate defect detection results. For example, the defect detection results can be a determination of whether a defect exists in the inspected area, whether the defect is a nuisance if the defect exists, a location of the defect if the defect exists and is not a nuisance, and/or a defect type of the defect if the defect exists and is not a nuisance. The defect detection techniques can detect defects using the input data and the feature data. In some implementations, the defect detection techniques used in the operation 406 can have a lower accuracy requirement than the D2D or D2DB technique. In some implementations, input data and feature data considered not reliable for the D2D technique or the D2DB technique can also be used for the defect detection techniques in the operation 406.

In some implementations, the defect detection techniques can be based on a comparison. As examples, FIGS. 7A-7B are flowcharts of example processes 700A-700B of methods for defect detection according to implementations of this disclosure. The process 700A-700B can be implemented as software and/or hardware modules in the system 100 of FIG. 1 and/or the system 300 of FIG. 3. For example, the processes 700A-700B can be implemented as modules in the system 300 by one or more apparatuses or systems included in the system 100. The processes 700A-700B are set forth as follows.

As an example, the process 700A is similar to the D2D technique. At operation 702, it can be determined whether a first SEM image matches to a second SEM image. The first and second SEM images are associated with the pattern of the IC and are both determined by the high-resolution inspection system. In some implementations, the first and second SEM images can be determined by the high-resolution system from the same IC including the same pattern. In some implementations, the first and second SEM images can be determined by the high-resolution system from different ICs including the same pattern. In some implementations, one of the first and second SEM images can be used as a reference image that is also determined by the high-resolution inspection system. In another implementation, the first and second SEM images are determined by different high-resolution inspection systems.

At operation 704, a defect detection result is determined based on whether the first SEM image matches to the second SEM image. For example, if the first and second SEM images match, a defect detection result can be determined as there is no defect detected in both the first and second SEM images. For another example, if the first and second SEM images do not match, a defect detection result can be determined as there is a defect detected in either the first SEM image or the second SEM image, depending on which image is used as a reference. The matching does not have to be exact and, for example, can be found when the two images are within a predetermined threshold or percentage similarity of each other.

As another example, the process 700B is similar to the D2DB technique. At operation 706, it can be determined whether any one of a first dataset matches to any one of a second dataset. The first dataset includes but is not limited to the SEM image and the SEM image contour. The second dataset includes but is not limited to the polygon, the reference image, the rendered image, the processed image, the simulated SEM image, the reference image contour, and the simulated SEM image contour.

At operation 708, a defect detection result is determined based on whether any one of the first dataset matches to any one of the second dataset. For example, if one of the first dataset matches to one of the second dataset, a defect detection result can be determined as there is no defect detected in the SEM image. For another example, if none of the first dataset does not match to any one of the second dataset, a defect detection result can be determined as there is a defect detected in the SEM image. The matching does not have to be exact and, for example, can be found when the two datasets are within a predetermined threshold or percentage similarity of each other.

Back to FIG. 4, at operation 408, a defect identification result is determined using the defect detection results. For example, the defect identification result can be outputted to indicate whether a defect exists in the inspected area, whether the defect is a nuisance if the defect exists, a location of the defect if the defect exists and is not a nuisance, and/or a defect type of the defect if the defect exists and is not a nuisance. The defect identification result can be determined based on the defect detection results using, for example, data fusion and/or data integration techniques. In some implementations, the data fusion techniques and/or the data integration techniques can include learning techniques that integrates the defect detection results.

Figure 8:
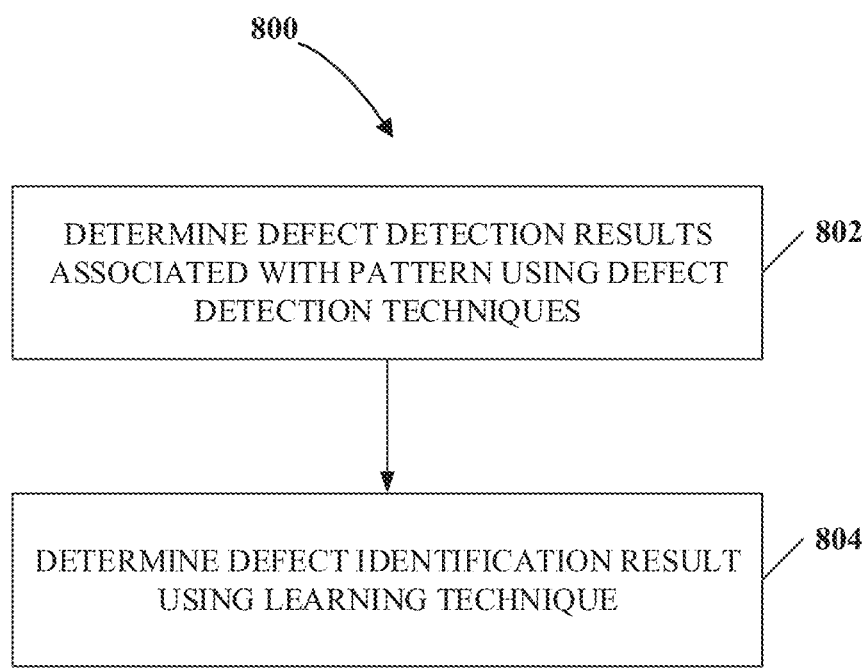
FIG. 8 is a flowchart of another example process of a method for defect identification according to implementations of this disclosure.

FIG. 8 is a flowchart of an example process 800 of a method for defect identification according to implementations of this disclosure. The process 800 can be implemented as software and/or hardware modules in the system 100 of FIG. 1 and/or the system 300 of FIG. 3. For example, the process 800 can be implemented as modules in the system 300 by one or more apparatuses or systems included in the system 100. The process 800 includes operations 802-804, which are set forth as follows.

At operation 802, defect detection results associated with the pattern are determined using defect detection techniques. For example, the defect detection results can be determined similar to the aforementioned processes including but not limited to the operation 406 of FIG. 4.

At operation 804, the defect identification result can be determined using a learning technique. For example, the learning technique can perform a weighted combination of the defect detection results, in which each of the defect detection results can be assigned a weight and combined together for consideration. For another example, the learning technique can determine the defect identification result using the weighted combination of the defect detection results as input. In some implementations, the learning technique can include a decision tree technique, a boosting technique, or a combination thereof.

The decision tree technique is a predictive model that can determine a target result (e.g., a target value) from multiple possible target results based on several input variables. The target result can be a set of discrete values (e.g., integers or texts). The target result can also be continuous values (e.g., real numbers). A decision tree can include multiple nodes. The decision tree can include internal nodes ("branches") that have forward conjunctions leading to other nodes. The decision tree can include external nodes ("leaves") that have no forward conjunction and represent a possible target result. An internal node of the decision tree can take input variables from a preceding internal node and determine an input variable (as its own output data) for a next node (either internal or external) based on predetermined rules.

In some implementations according to this disclosure, an internal node of a decision tree can represent a particular defect detection technique. For example, for a test pattern on an IC, a defect detection technique can determine either the test pattern has a defect ("defective") or no defect ("non-defective"), while it is prior knowledge whether the test pattern is truly defective or non-defective. Using such test patterns and the defect detection techniques, a decision tree model can be built. For a pattern on an IC being inspected, based on the defect detection results associated with the pattern determined using the defect detection techniques, whether it is truly defective or not can be determined using the built decision tree model.

The boosting technique, in a context of machine learning, is a technique for reducing bias and variance of target results determined by a machine learning technique (a "learner"). A learner is referred as a "weak learner" if its target results have weak correlation with true knowledge ("true results" that are known in prior). In some cases, a weak learner can obtain results only slightly better than random guessing. On the other hand, a learner is referred as a "strong learner" if its target results have strong correlation with true knowledge. The boosting technique can create a strong learner based on a set of weak learners. For example, the boosting technique can combine target results of the weak learners into a weighted sum and use the weighted sum as the target result of the strong learner. There are many different types of boosting algorithms, such as, for example, adaptive boosting ("AdaBoost"), linear programming boosting ("LPBoost"), gradient tree boosting, XGBoost, CoBoosting, BrownBoost, GentleBoost, RankBoost, TotalBoost, MadaBoost, LogitBoost, and others. For example, the AdaBoost can adaptively adjust the weak learners in favor of cases when target results of the weak learners are inconsistent with the true knowledge. In other words, AdaBoost is sensitive to noise and/or outliers of data, and can be less susceptible to overfitting.

In some implementations according to this disclosure, a defect detection technique can represent a weak learner. For example, a defect detection technique can represent a weak learner in the context of Adaboost. For example, for a test pattern on an IC, a defect detection technique can determine either the test pattern has a defect ("defective") or no defect ("non-defective"), while it is prior knowledge whether the test pattern is truly defective or non-defective. Using such test patterns and the defect detection techniques, a boosting model can be built. For a pattern on an IC being inspected, based on the defect detection results associated with the pattern determined using the defect detection techniques, whether it is truly defective or not can be determined using the built boosting model.

Due to the lower accuracy requirement of the defect detection techniques, each defect detection result has a possibility to be false positive and/or false negative. However, by using data fusion techniques and the learning technique, the defect identification result can reach a higher accuracy while not compromising the efficiency and cost for processing.

Figure 9:
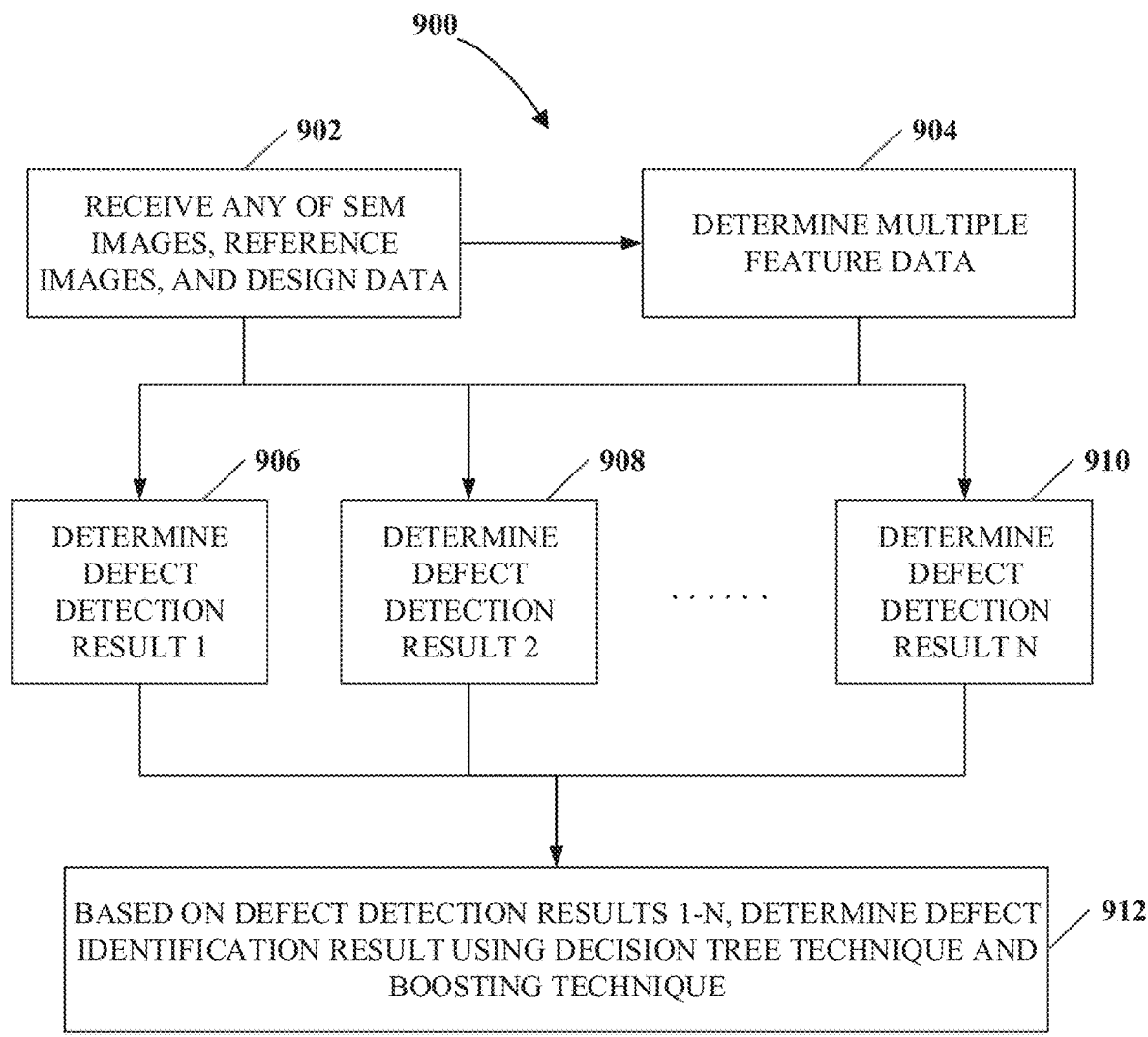
FIG. 9 is a flowchart of another example process of a method for defect identification according to implementations of this disclosure.

FIG. 9 is a flowchart of an example process 900 of a method for defect identification according to implementations of this disclosure. The process 900 can be implemented as software and/or hardware modules in the system 100 of FIG. 1 and/or the system 300 of FIG. 3. For example, the process 900 can be implemented as modules in the system 300 by one or more apparatuses or systems included in the system 100. The process 900 includes operations 902-912, which are set forth as follows.

At operation 902, SEM images, reference images, and/or design data are received as input data of a pattern associated with an IC. At operation 904, feature data of multiple features of the pattern is determined from the input data. The multiple features can be the features described in the operation 404 of the process 400 of FIG. 4 or any other features suitable for defect detection. At operation 906-910, defect detection results 1-N are determined using defect detection techniques 1-N, respectively.

In particular, defect detection result 1 is determined via operation 906, defect detection result 2 is determined via operation 908, and defect detection result N is determined via operation 910. The defect detection techniques can be similar to those described in the processes 600, 700A, and 700B, of FIG. 6 and FIG. 7 respectively, or any other techniques suitable for defect detection. At operation 912, based on the defect detection results 1-N, a defect identification result is determined using any of a decision tree technique, a boosting technique, and any combination thereof.

Figure 10:
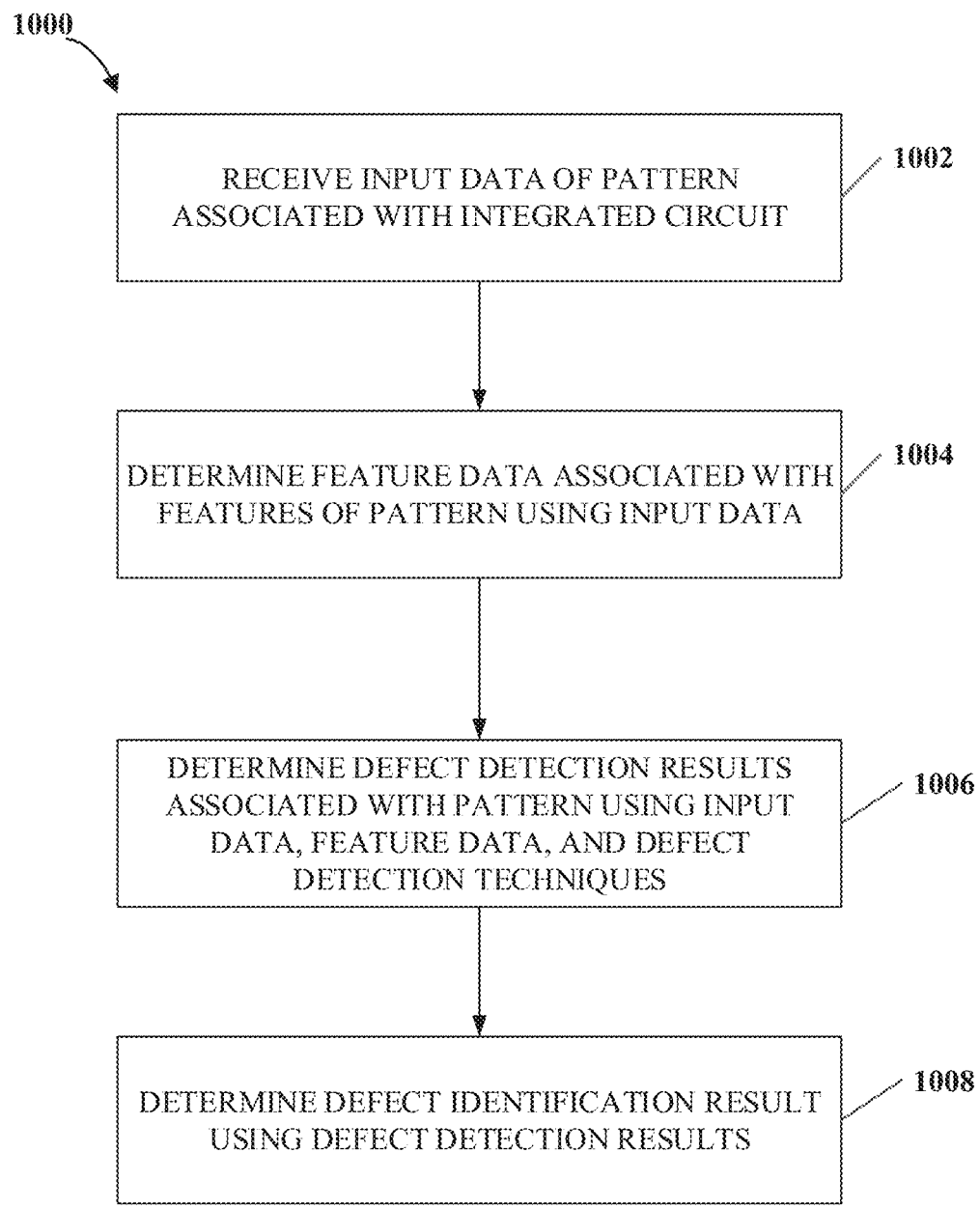
FIG. 10 is a method for identifying defects of integrated circuits in accordance with an implementation of this disclosure.

FIG. 10 is a method 1000 for identifying defects of integrated circuits in accordance with an implementation of this disclosure. The method 1000 includes receiving input data of a pattern associated with an integrated circuit via step 1002, determining feature data associated with features of the pattern using the input data via step 1004, determining defect detection results associated with the pattern using the input data, the feature data, and defect detection techniques via step 1006, and determining a defect identification result using the defect detection results via step 1008.

In an implementation, the input data includes any of a scanning electron microscope (SEM) image associated with the pattern, a reference image associated with the pattern, and design data associated with a design layout of the pattern, wherein the SEM image is determined by a high-resolution inspection system. The high-resolution inspection system comprises an electron beam inspection system. The feature data includes any of a SEM image contour determined from the SEM image, a reference image contour determined from the reference image, a polygon associated with the pattern determined from the design data, a rendered image determined from the polygon, a processed image determined from the rendered image by an image processing technique, a simulated SEM image determined based on the polygon by a SEM image simulation technique, and a simulated SEM image contour determined from the simulated SEM image.

In an implementation, determining feature data associated with features of the pattern using the input data comprises determining auxiliary data based on the design data, wherein the design data includes graphic design system (GDS) data, and determining the polygon from the auxiliary data, wherein a speed of determining the polygon from the auxiliary data is faster than a speed of determining the polygon from the design data.

In an implementation, determining defect detection results associated with the pattern using the input data, the feature data, and defect detection techniques comprises any of determining whether a match exists between a first SEM image and a second SEM image, wherein the first SEM image and the second SEM image are associated with the pattern and determined by the high-resolution inspection system, and determining whether a match exists between one of a first dataset and one of a second dataset. The first dataset includes the SEM image and the SEM image contour, and the second dataset includes the polygon, the reference image, the rendered image, the processed image, the simulated SEM image, the reference image contour, and the simulated SEM image contour.

In an implementation, determining a defect identification result using the defect detection results comprises determining the defect identification result using a learning technique that performs a weighted combination of the defect detection results. The learning technique comprises any of a decision tree technique and a boosting technique.

In some implementations, an improving process can be implemented for the methods and systems for defect identification described herein to self-improve ("evolve") or self-adapt defect identification performance (e.g., accuracy and/or efficiency) as the inspection process goes. For example, SEM images are generated as the output of a high-resolution inspection system. A defect identification system can process and analyze SEM images of an inspected IC to identify defects. The defect identification system can use a set of parameters to work. The parameters can be optimized to enable optimal work performance of the defect identification system. Once a defect identification result is determined by the defect identification system, it can be reviewed and analyzed in a reviewing process (e.g., by the defect reviewer module 308 in FIG. 3) to determine whether a defect is correctly identified, and/or whether an identified defect is a nuisance if it is correctly identified. Based on the review and analysis of the defect identification result, the parameters of the defect identification system can be updated to improve the performance thereof. In some implementations, the parameters can be stored and maintained in a database.

As shown in the above description, in the D3D method and system for defect identification that is in accordance with the present disclosure, although each defect detection technique might produce false positive and/or false negative results compared to D2D or D2DB techniques, by combining them using proper data integration/fusion techniques, and generating final decisions using decision tree techniques, robust defect detection can be achieved.

The disclosed methods and systems for defect identification can be used in production lines or inline production processes. Used in inline production processes, the D3D method and system also has the ability of continuous evolution (i.e., improving identification accuracy) as inspection goes on. Thus, time, resources, and costs for initial parameter setting and data collection of the D3D method and system can be reduced or minimized.

The implementations herein may be described in terms of functional block components and various processing steps. The disclosed processes and sequences may be performed alone or in any combination. Functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the disclosure could employ any number of conventional techniques for electronics configuration, signal processing and/or control, data processing and the like.

Aspects or portions of aspects of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of a system described herein, unless otherwise specified, does not have to be physically contained by the system, but is one that can be accessed remotely by the system, and does not have to be contiguous with other memory that might be physically contained by the system.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for identifying defects of integrated circuits, comprising:
   receiving input data of a pattern associated with an integrated circuit, wherein the input data includes any of a scanning electron microscope (SEM) image associated with the pattern, a reference image associated with the pattern, and design data associated with a design layout of the pattern;
   determining feature data associated with features of the pattern using the input data, wherein the feature data comprises a SEM image contour a reference image contour, a polygon associated with the pattern, a rendered image, a simulated SEM image, a processed image, and a simulated SEM image contour,
      wherein a SEM image contour is determined from the SEM image,
      wherein the reference image contour is determined from the reference image,
      wherein the polygon associated with the pattern is determined from the design data,
      wherein the rendered image is determined from the polygon,
      wherein the simulated SEM image is determined based on the polygon by a SEM image simulation technique,
      wherein the processed image is determined from the rendered image by an image processing technique, and
      wherein the simulated SEM image contour is determined from the simulated SEM image;
   determining, using respective defect detection techniques, respective defect detection results associated with the pattern, wherein each defect detection technique uses at least a subset of the input data and the feature data, wherein the at least the subset of the input data and the feature data comprising a first dataset and a second dataset,
wherein at least one of the defect detection techniques is a die-to-die defect detection technique and at least a second of the defect detection techniques is die-to-database defect detection technique, and
wherein determining the defect detection results associated with the pattern comprising:
determining that a defect exists in response to determining that no element of the first dataset matches any element of the second dataset; and
determining that a defect does not exist in response to determining that at least one element of the first data set matches at least one element of the second dataset, wherein
the first dataset comprises the SEM image and the SEM image contour, and
the second dataset comprises the polygon, the reference image, the rendered image, the processed image, the simulated SEM image, the reference image contour, and the simulated SEM image contour; and
determining a defect identification result as a weighted combination of the respective defect detection results of the respective defect detection techniques, wherein the respective defect detection results comprising at least two of a first result indicating whether a defect exists in an inspected area, a second result indicating whether the defect is a nuisance if the defect exists, a third result indicating a location of the defect if the defect exists, and a fourth result indicating a defect type of the defect if the defect exists and is not a nuisance.

2. The method of claim 1, wherein the SEM image is determined by an inspection system.

3. The method of claim 2, wherein the inspection system comprises an electron beam inspection system.

4. The method of claim 3, wherein determining feature data associated with features of the pattern using the input data comprises:
determining auxiliary data based on the design data, wherein the design data includes graphic design system (GDS) data; and
determining the polygon from the auxiliary data, wherein a speed of determining the polygon from the auxiliary data is faster than a speed of the determining the polygon from the design data.

5. The method of claim 3, wherein determining defect detection results associated with the pattern further comprises:
determining whether a second match exists between a first SEM image and a second SEM image, wherein the first SEM image and the second SEM image are associated with the pattern and determined by the inspection system.

6. The method of claim 1, wherein the defect identification result is determined using a learning system comprising:
a decision tree,
wherein each internal node of the decision tree corresponds to one of the defect detection techniques; and
wherein a boosting technique is used to improve results of the decision tree during a learning process.

7. A system for identifying defects of integrated circuits, comprising:
a processor; and
a memory coupled to the processor, the memory configured to store a set of instructions which when executed by the processor become operational with the processor to:
receive input data of a pattern associated with an integrated circuit, wherein the input data includes any of a scanning electron microscope (SEM) image associated with the pattern, a reference image associated with the pattern, or design data associated with a design layout of the pattern;
determine feature data associated with features of the pattern using the input data, wherein the feature data comprises at least one of a SEM image contour determined from the SEM image a reference image contour determined from the reference image, a polygon associated with the pattern determined from the design data, a rendered image determined from the polygon, a simulated SEM image determined based on the polygon by a SEM image simulation technique, a processed image determined from the rendered image by an image processing technique, or a simulated SEM image contour determined from the simulated SEM image;
determine, using respective defect detection techniques, respective defect detection results associated with the pattern,
wherein each defect detection technique uses at least a subset of the input data and the feature data, wherein the at least the subset of the input data and the feature data comprising a first dataset and a second dataset, and
wherein a defect detection technique determines that a defect exists in response to determining that no element of the first dataset matches any element of the second dataset, and determines that a defect does not exist in response to determining that at least one element of the first data set matches at least one element of the second dataset, wherein the first dataset comprises the SEM image and the SEM image contour, and the second dataset comprises the polygon, the reference image, the rendered image, the processed image, the simulated SEM image, the reference image contour, and the simulated SEM image contour; and
determine a defect identification result as a weighted combination of the respective defect detection results of the respective defect detection techniques, wherein the respective defect detection results comprising at least two of a first result indicating whether a defect exists in an inspected area, a second result indicating whether the defect is a nuisance if the defect exists, a third result indicating a location of the defect if the defect exists, and a fourth result indicating a defect type of the defect if the defect exists and is not a nuisance.

8. The system of claim 7, wherein the SEM image is determined by an inspection system.

9. The system of claim 8, wherein the inspection system comprises an electron beam inspection system.

10. The system of claim 8, wherein the feature data further comprises any of a SEM image contour determined from the SEM image and a reference image contour determined from the reference image.

11. The system of claim 10, wherein the set of instructions operational with the processor to determine defect detection results associated with the pattern comprises further instructions to:
  determine whether a second match exists between a first SEM image and a second SEM image, wherein the first SEM image and the second SEM image are associated with the pattern and determined by the inspection system.

12. The system of claim 7, wherein a learning technique that comprises one of a decision tree technique or a boosting technique is used to determine the defect identification result.

13. A non-transitory computer-readable medium storing a set of instructions which when executed by a computer system using a processor become operational with the processor for identifying defects of integrated circuits, the non-transitory computer-readable medium comprising instructions to:
  receive input data of a pattern associated with an integrated circuit, wherein the input data includes any of a scanning electron microscope (SEM) image associated with the pattern, a reference image associated with the pattern, or design data associated with a design layout of the pattern;
  determine feature data associated with features of the pattern using the input data, wherein the feature data comprises at least one of a SEM image contour determined from the SEM image a reference image contour determined from the reference image, a polygon associated with the pattern determined from the design data, a rendered image determined from the polygon, a simulated SEM image determined based on the polygon by a SEM image simulation technique, a processed image determined from the rendered image by an image processing technique, or a simulated SEM image contour determined from the simulated SEM image;
  determine, using respective defect detection techniques, respective defect detection results associated with the pattern, wherein each defect detection technique uses at least a subset of the input data and the feature data, wherein the at least the subset of the input data and the feature data comprising a first dataset and a second dataset, and wherein a defect detection technique comprises instructions to:
    determine that a defect exists in response to determining that no element of the first dataset matches any element of the second dataset; and
    determine that a defect does not exist in response to determining that at least one element of the first data set matches at least one element of the second dataset, wherein
      the first dataset comprises the SEM image and the SEM image contour, and
      the second dataset comprises the polygon, the reference image, the rendered image, the processed image, the simulated SEM image, the reference image contour, and the simulated SEM image contour; and
  determine a defect identification result as a weighted combination of the defect respective detection results of the respective defect detection techniques, wherein the respective defect detection results comprising at least two of a first result indicating whether a defect exists in an inspected area, a second result indicating whether the defect is a nuisance if the defect exists, a third result indicating a location of the defect if the defect exists, and a fourth result indicating a defect type of the defect if the defect exists and is not a nuisance.

14. The computer-readable medium of claim 13, wherein the SEM image is determined by an electron beam inspection system.

15. The computer-readable medium of claim 14, wherein the feature data further comprises any of a SEM image contour determined from the SEM image, and a simulated SEM image contour determined from the simulated SEM image.

16. The computer-readable medium of claim 13, wherein the instructions to determine the defect identification result comprises further instructions to:
  determine the defect identification result using any of a decision tree technique and a boosting technique by performing the weighted combination of the defect detection results.

* * * * *